May 16, 1967 O. J. LEONE 3,319,457

DEW POINT INDICATOR WITH ETTINGSHAUSEN AND PELTIER COOLERS

Filed July 7, 1964 2 Sheets-Sheet 1

INVENTOR

Otto J. Leone

By Hooper, Leonard & Buell his attorneys

May 16, 1967 O. J. LEONE 3,319,457

DEW POINT INDICATOR WITH ETTINGSHAUSEN AND PELTIER COOLERS

Filed July 7, 1964 2 Sheets-Sheet 2

INVENTOR
Otto J. Leone
By Hooper, Leonard & Buell
his attorneys

United States Patent Office 3,319,457
Patented May 16, 1967

3,319,457

DEW POINT INDICATOR WITH ETTINGSHAUSEN AND PELTIER COOLERS

Otto J. Leone, P.O. Box 24, West Newton, Pa. 15089

Filed July 7, 1964, Ser. No. 380,744
12 Claims. (Cl. 73—17)

This invention relates to an apparatus for detecting the dew point of a stream of gas and more particularly pertains to a device for automatically or manually measuring dew point in a continuous manner utilizing magnetic thermoelectric cooling effects. This is an improvement in my U.S. Patent No. 2,979,950 which describes a thermoelectric Peltier means indicating dew point of flowing gases. The Peltier type cooler has a low cooling efficiency for dew points or frost points at minus 60° centigrade. It is difficult to reach temperatures below a minus 60° centigrade because merely increasing the current will not decrease the cold surface temperatures but rather at some point will cause the cold surface to become warmer and even destroy the Peltier cooler device.

This invention provides an apparatus capable of manually or automatically and continuously indicating varying dew points at below minus 60° as well as dew points above minus 60° C.

I provide an apparatus for detecting the dew point of a stream of gas comprising a block of electrically conductive or semi-conductive material in contact with the gas, means supplying D.C. current through the block, means supplying magnetic lines of force normal to the current flow through the block causing a temperature differential between a cold surface of the block in parallel relationship with a hot surface of the block on opposite sides of the block, means dynamically responsive to a dew spot standard reference on the cold surface and controlling the temperature of the cold surface to maintain the standard dew spot, and means indicating the varying temperature of the cold surface of the block whereby the dew point of the gas is detected.

I preferably provide a thermoelectric pack of dissimilar thermoelectric materials in the pathway of a magnetic field having a cold junction which is adjacent to a hot surface of a thermomagnetic or Ettingshausen heat pump of which the block of electrically conductive material is in contact with the gas to be analyzed. The temperature of the thermoelectric pack partly controls the temperature of the block and maintains a standard dew spot on the cold surface of the block. The D.C. current flowing through the pack is controlled by a magnetic amplifier or a silicon controlled rectifier control circuit or other suitable control circuit providing an output current inversely proportional to the control current. The output of the magnetic amplifier or control circuit is rectified and coupled to the thermoelectric pack.

D.C. current can be used to control the Ettingshausen heat pump which may use but is not limited to a block of bismuth alloy.

I preferably provide an apparatus for directly detecting variations in the dew spot which comprises a strip of dielectric material on which the dew spot is formed. The dielectric material is adjacent to the cold surface of the electrically conductive block. A pair of spaced leads connected to the dew spot member are coupled to an amplifier whose output is coupled to the magnetic amplifier control windings.

I preferably provide an alternate apparatus for directly detecting variations in the dew spot which comprises a light source directed toward the dew spot, a photosensor receiving the reflected light from the dew spot and means coupling the output of the photosensor to the means controlling.

In the foregoing general statement I have set out certain objects, purposes and advantages of my invention. Other objects, purposes and advantages will be apparent from a consideration of the following description and the accompanying drawing in which.

Figure 1:
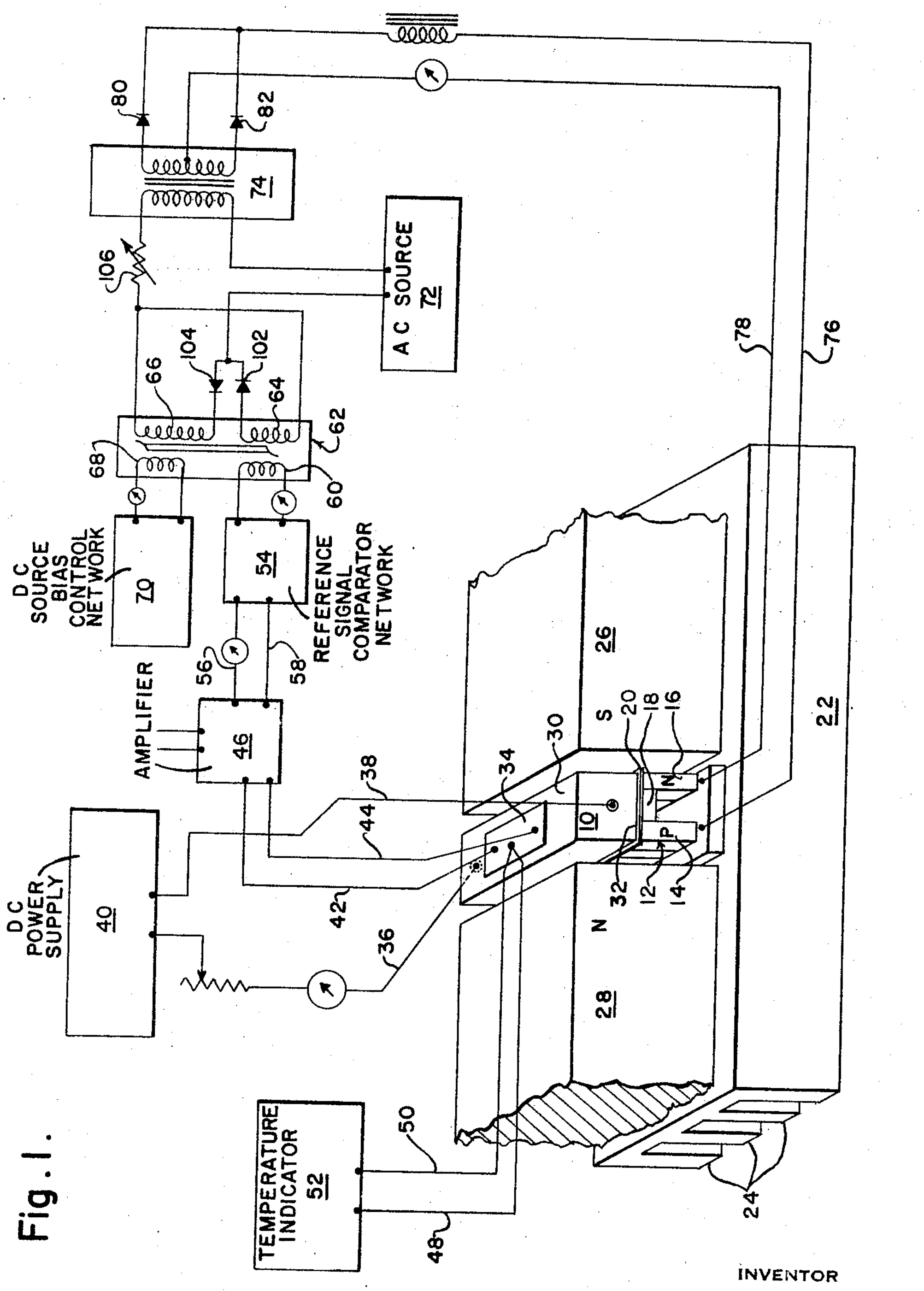
FIGURE 1 is a perspective view of one embodiment of this invention.

Referring to FIGURE 1 block 10 is an Ettingshausen cooler unit which may be made of various materials capable of producing the Ettingshausen effect. Such materials may include bismuth-antimony alloys. Block 10 rests on a thermoelectric pack 12. The thermoelectric pack 12 comprises blocks of dissimilar semi-conductive substance (e.g., bismuth telluride, selenium telluride, lead telluride), or suitable semi-conductive crystals which have been doped by the diffusion thereinto of impurities of different polarities (e.g., silicon with phosphorous impurities forming a P-type semi-conductor 14), and silicon with aluminum impurity forming an N-type semi-conductor 16, or various other semi-conductor systems, the characteristic of which is that they have a high thermoelectric output when thermoelectric junctions are made between dissimilar ones of such substances, which will be "hot" or "cold" depending upon the direction of flow of electrons when connected in a direct current circuit. The P-type block 14 is joined to the N-type block 16 by a bar of copper 18. The bar of copper 18 is a cold junction. The thermoelectric pack 12 is electrically insulated from the block 10 by a thin sheet of dielectric 20. The thermoelectric pack 12 has its hot junctions resting directly on a heat sink 22 having fins 24. A permanent magnet having a south pole 26 and a north pole 28 provides a magnetic field through the block 10 and the thermoelectric pack 12. It is understood that an electromagnet or any magnetic technique may be used to provide the necessary magnetic lines of force. When current passes through the block 10, a temperature differential exists between the surface 30 and the surface 32, and when current passes through the thermoelectric pack, copper bar 18 becomes a cold junction when current has the proper polarity. Surface 30 of the block 10 is a "cold" surface and surface 32 of the block 10 is a "hot" surface. To increase the temperature differential and thereby make bar 18 colder and surface 30 colder, a magnetic field provided by the south and north poles 26 and 28, respectively, is placed perpendicular or normal to the flow of current through the block 10. This is known as the Ettingshausen effect. A dew spot member 34 comprising a dielectric (electrical insulation only and not thermal insulation) is mounted on the cold surface 30. Leads 36 and 38 couple D.C. power supply 40 to the block 10. Leads 42 and 44 couple the dew spot member 34 to an amplifier 46. Leads 48 and 50 electrically couple the dew spot member 34 to a temperature indicator 52. The output of the amplifier 46 is coupled to a reference signal comparator network 54 through leads 56 and 58. The output of the comparator network 54 is fed to control winding 60 wound on magnetic amplifier core 62. The magnetic amplifier core 62 has gate windings or output windings 64 and 66. Gate windings 64 and 66 are wound in the same direction on the magnetic core 62. A bias control winding 68 is coupled to a bias control network 70 which comprises a D.C. source. The magnetomotive force produced by the current flowing through winding 68 is such that it tends to oppose the flux produced by the magnetomotive force which is caused by the current flowing in the control winding 60. The flux produced by the magnetomotive force of winding 68 is the overriding flux and the flux produced by winding 60 is the reducing flux which reduces the flux produced by winding 68. An A.C. source 72 supplies power to the gating coils 64 and 66. Rectifiers 102 and 104 rectify the signal from gating coils 64 and 66. The variable resistor 106 varies the sensitivity for a given control signal input to the magnetic amplifier. A transformer 74 couples gate windings 64 and 66 to leads 76 and 78 through rectifiers 80 and 82. Leads 76 and 78 are connected to P-type material 14 and N-type material 16.

The operation of the schematic FIGURE 1 is as follows: A stream of gas is passed over and in contact with a dew spot member 34 of dielectric material. The cold dew spot membr 34 in contact with the gas forms a dew spot on the dew spot member 34. The amount of dew spot formed on the dew spot member 34 is inversely proportional to the electrical surface leakage or resistance developed between leads 42 and 44. As the dew spot thickness or mass increases, the resistance between leads 42 and 44 decreases. An increasing thickness or mass of dew spot is due to a dew spot member which is of a temperature lower than the dew point. The signal developed between leads 42 and 44 is amplified by signal amplifier 46 and then coupled to an ensuing signal comparator network 54. The bias control network 70 is precalibrated within a certain operating range. The signal comparator network 54 produces a D.C. error voltage at control windings 60. This D.C. error voltage is proportional to the voltage developed between leads 42 and 44. The bias control network 70 produces a current through bias winding 68 on magnetic amplifier core 62. This current produces a flux which changes the reactance of gate windings 64 and 66. The greater the flux flowing in magnetic amplifier core 62 produced by the magnetomotive force of the bias winding 68, the lower the reactance of the gate windings 64 and 66 and the greater the current flow from gate windings 64 and 66 through transformer 74 through leads 76 and 78. When there is an error voltage produced from the signal comparator network 54, it will decrease the flux caused by the magnetomotive force from bias winding 68 and thereby increase reactance of gate windings 64 and 66 and thereby reduce the voltage output from transformer 74 to leads 76 and 78. The voltage output from transformer 74 is rectified by rectifiers 80 and 82 to produce the necessary D.C. current. When leads 76 and 78 have a high current, block 18 becomes colder thereby causing the hot surface 32 to be cooler and relatively cause the cold surface 30 to become colder. When the voltage across leads 76 and 78 is reduced, the bar 18, which is the cold junction of thermoelectric pack 12, becomes warmer thereby warming the block 10 and increasing the temperature of the cold surface 30.

There is a direct relationship between the resistance of the dew spot or frost point between leads 42 and 44 and the voltage produced between leads 76 and 78. When the electrical resistance of the dew spot across leads 42 and 44 decreases, the voltage between leads 76 and 78 decreases. The decrease in resistance between leads 42 and 44 is caused because of an increased dew spot mass which is caused by a lower temperature lower than the desired dew point temperature, and the decreased electrical resistance of the dew spot between leads 42 and 44 causes corrective action by reducing the voltage between leads 76 and 78 thereby increasing the temperature at cold surface 30. To keep a standard dew point within a given range, the bias control network 70 and the reference signal comparator network 54 can be precalibrated within a given operating range.

While maintaining a constant dew spot on dew point member 34, the temperature at dew spot member 34 caused by the temperature of the cold surface 30 is constantly fluctuating. This fluctuation is sensed by a voltage produced by the thermocoupled materials at temperature indicator 52 coupled by leads 48 and 50 to the dew point member 34.

While I have shown a magnetic amplifier and a permanent magnet, it is to be understood that a silicon controlled rectifier circuit and other type circuits may be used and an electromagnet may be used for certain operations.

Figures 2, 3:
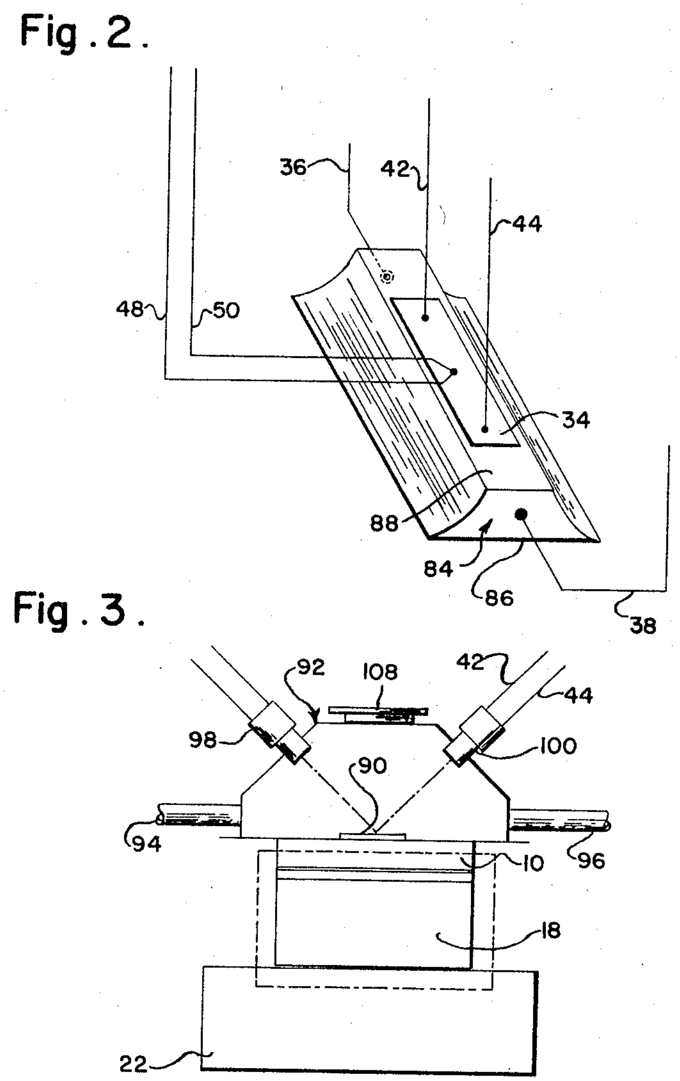
FIGURE 2 is a perspective view of a bar of alloy used in the Ettingshausen heat pump.
FIGURE 3 is a perspective view of a second embodiment of this invention.

FIGURE 2 shows a shaped bar cooler 84 which is used to obtain larger temperature differences between the hot surface 86 and the cold surface 88 of the Ettingshausen cooler than the unit 10 used in FIGURE 1.

Strips of Ettingshausen devices may be cascaded in order to obtain larger temperature differences between the hot and cold surfaces. However, each of the successive lower strips in the stack must be able to dissipate the current heating effects in it. Instead of stacking the layers which would have increasing surface areas lower in the stack, one piece of shaped material is used in which the horizontal surface area as shown in FIGURE 2 gradually increases toward the bottom of the unit forming an exponential curve.

Referring to FIGURE 3 a photoelectric detector is shown. A mirrored plate 90 rests on top of either an Ettingshausen cooler or Peltier cooler. The stream of gas passes into chamber 92 having a visual inspection cover 108 from input duct 94 and out of duct 96 leaving a dew spot on the mirror plate 90. A beamed source of light 98 is directed at a 45° angle and is sensed by the photosensor 100 also directed at a 45° angle. When there is no dew deposit on the plate 90, very little light reaches the sensor 100. The light reaching the sensor 100 produces an electrical signal across leads 42 and 44 which correspond to the same leads in FIGURE 1. The signal is then amplified. This techniqlue of dew spot detection is used with the Peltier cooler and/or the Ettingshausen cooler as shown in FIGURE 1 with the magnetic field applied.

While I have illustrated and described certain preferred embodiments of my invention in the foregoing specification, it will be apparent that this invention may be otherwise embodied within the scope of the following claims.

I claim:

1. An apparatus for detecting the dew point of a stream of gas comprising:
   (a) a block of electrically conductive material in contact with the gas;
   (b) means supplying D.C. current through the block;
   (c) means supplying magnetic lines of force normal to the current flow through the block causing a temperature differential between a cold surface of the block in parallel relationship with a hot surface of the block on opposite sides of the block;
   (d) a thermoelectric pack of dissimilar thermoelectric materials having a cold junction adjacent to the hot surface of the block to control the temperature of the block and maintain a standard dew spot on the cold surface of the block; and
   (e) means indicating the varying temperature of the cold surface of the block whereby the dew point of the gas is detected.

2. An apparatus for detecting the dew point of a stream of gas comprising:
   (a) a block of electrically conductive material in contact with the gas;
   (b) means supplying D.C. current through the block;
   (c) means supplying magnetic lines of force normal temperature differential between a cold surface of the block in parallel relationship with a hot surface of the block on opposite sides of the block;
   (d) a thermoelectric pack of dissimilar thermoelectric materials having a cold junction adjacent to the hot surface of the block to control the temperature of the block and maintain a standard dew spot on the cold surface of the block;
   (e) means controlling the temperature of the cold junction of the pack;
   (f) means directly detecting variations in the dew spot from the standard value dew spot to regulate the means for controlling; and (g) means indicating the varying temperature of the cold surface of the block whereby the dew point of the gas is detected.

3. An apparatus for detecting the dew point of a stream of gas comprising:

(a) a block of electrically conductive material in contact with the gas;

(b) means supplying D.C. current through the block;

(c) means supplying magnetic lines of force normal to the current flow through the block causing a temperature differential between a cold surface of the block in parallel relationship with a hot surface of the block on opposite sides of the block;

(d) a thermoelectric pack of dissimilar thermoelectric materials having a cold junction adjacent to the hot surface of the block to control the temperature of the block and maintain a standard dew spot on the cold surface of the block;

(e) means controlling a D.C. current flowing through the pack to control the temperature of the cold junction of the pack;

(f) means directly detecting variations in the dew spot from the standard value dew spot to regulate the means for controlling; and (g) means indicating the varying temperature of the cold surfact of the block whereby the dew point of the gas is detected.

4. An apparatus for detecting the dew point of a stream of gas comprising:

(a) A block of electrically conductive material in contact with the gas;

(b) means supplying D. C. current through the block;

(c) means supplying magnetic lines of force normal to the current flow through the block causing a temperature differential between a cold surface of the block in parallel relationship with a hot surface of the block on opposite sides of the block;

(d) a thermoelectric pack of dissimilar thermoelectric materials in the path of the magnetic lines of force and having a cold junction adjacent to the hot surface of the block to control the temperature of the block and maintain a standard dew spot on the cold surface of the block;

(e) means controlling a D. C. current flowing through the pack to control the temperature of the cold junction of the pack;

(f) means directly detecting variations in the dew spot from the standard value dew spot to regulate the means for controlling; and (g) means indicating the varying temperature of the cold surface of the block whereby the dew point of the gas is detected.

5. An apparatus for detecting the dew point of a stream of gas as recited in claim 4 wherein the means for controlling comprises:

(a) A magnetic amplifier providing an output current inversely proportional to the control current in a control winding of the magnetic amplifier; and (b) means rectifying the coupling the output of the magnetic amplifier to the thermoelectric pack.

6. An apparatus for detecting the dew point of a stream of gas as recited in claim 5 wherein the means for directly detecting variations in the dew spot comprises:

(a) A dew spot member of dielectric material upon which the standard dew spot is formed, the member adjacent to the cold surface of the block;

(b) an amplifier;

(c) a pair of spaced leads connected to the dew spot member and coupled to the amplifier; and (d) means coupling the amplifier to the control winding of the magnetic amplifier.

7. An apparatus for detecting the dew point of a stream of gas as recited in claim 6 including a means to dissipate the heat from the thermoelectric pack.

8. An apparatus for detecting the dew point of a stream of gas as recited in claim 6 wherein the means coupling the amplifier to the control winding of the magnetic amplifier comprises a reference signal comparator network which produces an error voltage to the control winding of the magnetic amplifier.

9. An apparatus for detecting the dew point of a stream of gas as recited in claim 7 wherein the means to dissipate the heat from the thermoelectric pack comprises a heat sink.

10. An apparatus for detecting the dew point of a stream of gas as recited in claim 8 including a means maintaining a standard current output from the magnetic amplifier when the reference signal comparator network produces a zero error voltage to the control windings of the magnetic amplifier.

11. An apparatus for detecting the dew point of a stream of gas comprising:

(a) A block of electrically conductive material in contact with the gas;

(b) means supplying D. C. current through the block;

(c) means supplying magnetic lines of force normal to the current flow through the block causing a temperature differential between a cold surface of the block in parallel relationship with a hot surface of the block on opposite sides of the block;

(d) a thermoelectric pack of dissimilar thermoelectric materials having a cold junction adjacent to the hot surface of the block to control the temperature of the block and maintain a standard dew spot on the cold surface of the block;

(e) means controlling a D. C. current flowing through the pack to control the temperature of the cold junction of the pack;

(f) optical detector means detecting variations in the dew spot from the standard value dew spot and regulating the means for controlling; and (g) means indicating the varying temperature of the cold surface of the block whereby the dew point of the gas is detected.

12. An apparatus for detecting the dew point of a stream of gas as recited in claim 11 wherein the optical detector means comprises:

(a) A light source directed to a dew spot surface;

(b) a photosensor receiving the reflected light from the dew spot; and (c) means coupling the output of the photosensor to the means controlling.

References Cited by the Examiner

UNITED STATES PATENTS

| | | | |
|---|---|---|---|
| 2,979,950 | 4/1961 | Leone | 73—17 X |
| 3,090,207 | 5/1963 | Smith et al. | 62—3 |
| 3,154,927 | 11/1964 | Simon | 62—3 |
| 3,166,928 | 1/1965 | Jackson et al. | 73—17 |

OTHER REFERENCES

O'Brien, J., et al.: "Cascading of Peltier Couples for Thermoelectric Cooling," in Journal of Applied Physics, 27 (7) pages 820–823, July 1956, QC1J82 in Scientific Library.

O'Brien, J., et al.: "Ettingshausen Effect and Thermomagnetic Cooling," in Journal of Applied Physics 29 (7), pages 1010–1012, July 1958, QC1J82 in Scientific Library.

Goldsmid, H. J.: "Thermoelectric and Thermomagnetic Cooling," in Industrial Electronics, 1 (9), pages 467–470, June 1963, TK7800I15 in Scientific Library.

Wolfe, Raymond: "Magnetothermoelectricity," Scientific American, June 1964, pages 70–82.

RICHARD C. QUEISSER, *Primary Examiner.*

J. C. GOLDSTEIN, *Assistant Examiner.*

UNITED STATES PATENT OFFICE

CERTIFICATE OF CORRECTION

Patent No. 3,319,457 May 16, 1967

Otto J. Leone

It is hereby certified that error appears in the above numbered patent requiring correction and that the said Letters Patent should read as corrected below.

Column 4, line 31, for "techniqlue" read -- technique --; column 4, line 64, after "normal" insert -- to the current flow through the block causing a --; column 5, line 28, for "surfact" read -- surface --.

Signed and sealed this 21st day of November 1967.

(SEAL)
Attest:

Edward M. Fletcher, Jr.
Attesting Officer

EDWARD J. BRENNER
Commissioner of Patents